106-99 AU 113 EX
12/8/81 XR 4,304,604

United States Patent [19]

Daerr et al.

[11] 4,304,604

[45] Dec. 8, 1981

[54] PRODUCTION, COMPOSITION AND AFTERTREATMENT OF MINERAL FIBERS FOR THE MICRO-REINFORCEMENT OF BINDERS OF BUILDING MATERIALS

[75] Inventors: Georg M. Daerr, Bad Homburg von der Hohe; Karl H. Gruenthaler, Usingen; Hans Gaar, Steinbach, all of Fed. Rep. of Germany

[73] Assignee: Werhahn & Neuen, Neuss, Fed. Rep. of Germany

[21] Appl. No.: 91,079

[22] Filed: Nov. 5, 1979

[30] Foreign Application Priority Data

Nov. 10, 1978 [DE] Fed. Rep. of Germany ....... 2848731

[51] Int. Cl.[3] .............................................. C03C 13/00

[52] U.S. Cl. .......................................... 501/38; 106/99

[58] Field of Search .......................... 106/50; 65/2, 33

[56] References Cited

U.S. PATENT DOCUMENTS

| | | | |
|---|---|---|---|
| 3,377,233 | 4/1968 | Jackson | 161/174 |
| 3,557,575 | 1/1971 | Beall et al. | 65/33 |
| 3,736,162 | 5/1973 | Chalovsky et al. | 106/50 |
| 3,854,986 | 12/1974 | Chalovsky et al. | 106/50 |
| 3,953,185 | 4/1976 | Aoki et al. | 65/8 |
| 3,966,481 | 6/1976 | Atkinson et al. | 106/50 |
| 4,008,094 | 2/1977 | Beall et al. | 106/99 |
| 4,199,336 | 4/1980 | Rittler | 106/50 |

FOREIGN PATENT DOCUMENTS

| | | |
|---|---|---|
| 362631 | 4/1921 | Fed. Rep. of Germany . |
| 90983 | 6/1972 | Fed. Rep. of Germany . |
| 2332243 | 7/1977 | France . |
| 1505609 | 3/1978 | United Kingdom . |
| 1517448 | 7/1978 | United Kingdom . |

*Primary Examiner*—James Poer
*Attorney, Agent, or Firm*—Fisher, Christen & Sabol

[57] ABSTRACT

Method for the production of mineral fibers resistant to alkaline media which are to be used for the micro-reinforcement of cement-, lime- and/or plaster-bound or bituminous binders or building materials. The starting material is a mixture of extrusive rocks with an addition of 4 to 6 weight percent of $ZrO_2$, based on the end product, in a composition that is readily fusible and easy to process into fibers of high mechanical strength and resistance to alkaline media. The mixture is fused at a temperature between 1350° and 1500° C. and is then processed into fibers 10 to 20 μm in diameter.

6 Claims, No Drawings

PRODUCTION, COMPOSITION AND AFTERTREATMENT OF MINERAL FIBERS FOR THE MICRO-REINFORCEMENT OF BINDERS OF BUILDING MATERIALS

BACKGROUND OF THIS INVENTION

1. Field of This Invention

The present invention relates to a method for the production of mineral fibers which are resistant to alkaline media and to be used for the micro-reinforcement of cement-, lime- and/or plaster-bound or bituminous binders of building materials. Further subject matters of this invention are the composition of the fibers and the aftertreatment to increase their bond strength.

2. Prior Art

The range of application of many building materials, such as cement, concrete, plaster, lime or others, is strongly restricted by their low tensile strength, bending strength and impact strength. It is well known that the above properties can be improved by so-called micro-reinforcement, i.e. by the addition of fibrous materials used for this purpose which are either natural fibers, such as asbestos or plant fibers, or artificial fibers made from steel, glass, organic polymers or carbon. The examination of these fibers for their suitability as reinforcing material for cement-, plaster- and lime-bound as well as bituminous building materials so far has furnished unsatisfactory results in most of the cases. Aspects of major importance in this context are environmental implications, e.g. of the use of asbestos, and material-specific problems.

Even the commercially available glass fibers which were initially regarded as suitable in the end turned out to be insufficiently resistant to alkaline media, which means that they lose their favorable mechanical properties, in particular their tensile strength, as a result of the corrosion starting on the surface of the glass fibers in cement-bound building materials.

To protect the glass fibers from being attached by the alkaline solution, they have already been provided with alkali-resistant coatings. This, however, was not an effective measure to prevent either attack at fiber fracture surfaces or at defects in the protective coating. Another serious drawback was that the protective coating reduced the bond strength of the fibers in the binder matrix; as a result, the intended reinforcing effect of the fibers was not achieved, and the mechanical properties were substantially impaired.

BROAD DESCRIPTION OF THIS INVENTION

The objective of the present invention is to overcome the above-described disadvantages of conventional micro-reinforcements of binders and building materials of said type and to develop a method for the production of mineral fibers of high tensile strength and resistance to alkaline media from a low-priced raw material that is available in large quantities. Another objective is to achieve high bond strength between the fibers and the matrix.

It has been found that advance in the art can be achieved if the starting material for a process of the above type is a mixture of extrusive rocks such as foamed lava, quartz porphyry, andesite, basalt or diabase, with an addition of 4 to 6 weight percent zirconium oxide related to the end product, said mixture being used in a composition that is readily fusible and easy to process into fibers of high mechanical strength and resistance to alkaline media. With this method the mixture is fused at temperatures between 1350° C. and 1500° C. and then processed into fibers 10 to 20 μm in diameter.

The zirconium oxide is preferably added to the starting material of extrusive rock in the form of zirconium silicate.

To achieve controlled recrystallization and thus a further improvement in the resistance to alkaline media, an advantageous embodiment of this invention provides for adjustment of the $TiO_2$ content of the end product or of the molten glass to 3 to 6 weight percent. The $TiO_2$ then acts as the nucleating agent. The recrystallization of the fibers can be achieved by a heat treatment at between 800° C. and 900° C. for not more than 1 minute. In other cases subjecting the mineral fibers to a two-stage heat treatment was found to be suitable for recrystallization, the temperature during the first stage ranging between 650° C. and 750° C. and during the second stage between 800° C. and 900° C.

Another advantageous embodiment of invention is that the mixture to be used as starting material has the following composition, related to the purely oxidic constituents:

| | | | |
|---|---|---|---|
| $SiO_2$ | between | 48 and 51 | weight % |
| $Al_2O_3$ | " | 12 and 14 | weight % |
| $Fe_2O_3$ | " | 8 and 10 | weight % |
| CaO | " | 6 and 8 | weight % |
| MgO | " | 10 and 12 | weight % |
| $TiO_2$ | " | 2 and 6 | weight % |
| $ZrO_2$ | " | 4 and 6 | weight % |
| $K_2O + Na_2O$ | up to | 5 | weight % max. |

These quantities also apply to the molten glass and the end product.

According to the present invention the bond strength of mineral fibers in a matrix of cement-, lime- and/or plaster-bound or bituminous binders is increased by covering the mineral fibers with hydrated or unhydrated cement dust or with fine calcium silicate or calcium silicate hydrate dust. This method can be used with particular success for the mineral fibers produced according to this invention. The fine dust is best applied directly to the fiber surface after the fiber has left the drawing die, or it is applied to the finished mineral fiber together with an organic sizing, or subsequently on top of a previously applied sizing.

Further characteristic features, advantages and potential applications of the method according to this invention are apparent from the following description of additional details.

Contrary to the conventional methods of rock and mineral wool production the favorable temperature-viscosity behavior of the glass composition according to this invention makes it is possible to draw continuous fibers from a tank. This creates a broad basis for the manufacture of glass fiber products, as the fibers can be embedded in the matrix also in the form of fabrics or rovings.

DETAILED DESCRIPTION OF THIS INVENTION

Example 1

A characteristic feature of this invention is the resistance of the glass fibers to alkaline media, which is achieved by the addition of zirconium oxide. In the case of a glass composition of

| | | |
|---|---|---|
| $SiO_2$ | about | 49.2 weight % |
| $Al_2O_3$ | " | 12.7 weight % |
| $Fe_2O_3$ | " | 9.2 weight % |
| CaO | " | 7.2 weight % |
| MgO | " | 10.7 weight % |
| $K_2O + Na_2O$ | " | 4.8 weight % |
| $TiO_2$ | " | 2.0 weight % |
| $ZrO_2$ | " | 4.2 weight % |

measurements in a boiling aqueous portland cement solution yield a leaching rate of $70 \cdot 10^{-6}$ g/cm$^2$ after 24-hour leaching; in contrast to this, the leaching rate for a boron silicate glass is $250 \cdot 10^{-6}$ g/cm$^2$ already after six hours.

In this example the glass composition according to the present invention is an optimum; even insignificant deviations bring about surprisingly large reductions of the resistance to alkaline media. This applies in particular to the $CaO/MgO/Fe_2O_3$ ratio.

Example 2

The resistance to alkaline media of the materials specified in Example 1 was further improved if the glass fibers were subjected to a short controlled recrystallization treatment. In this case an addition of titanium oxide of a maximum of 6 weight percent was found to be optimal. This treatment produced a fine-crystalline structure and thus kept the decrease in tensile strength, which has so far been observed to result from undesired recrystallization, within acceptable limits. This in turn resulted in a sufficiently high tensile strength for the described application.

Example 3

The starting material had the following composition:

| | | |
|---|---|---|
| $SiO_2$ | about | 48.1 weight % |
| $Al_2O_3$ | " | 12.4 weight % |
| $Fe_2O_3$ | " | 9.1 weight % |
| CaO | " | 7 weight % |
| MgO | " | 10.5 weight % |
| $K_2O + Na_2O$ | " | 4.7 weight % |
| $TiO_2$ | " | 4 weight % |
| $ZrO_2$ | " | 4.2 weight % |

Recrystallization can be effected either by a one-stage heat treatment at 800° C. to 900° C. or a two-stage heat treatment at 650° C. to 750° C. and 800° C. to 900° C. The treatment periods required to achieve optimum tensile strength values are below one minute.

These measures, i.e. addition of titanium oxide in a maximum amount of 6 weight percent and controlled recrystallization, led to a lowering of the leaching rate in boiling aqueous portland cement solution after 24 hours from $70 \cdot 10^{-6}$ g/cm$^2$ to $10 \cdot 10^{-6}$ g/cm$^2$.

Another important feature of this invention is the surface treatment of the fibers to achieve a high bond strength between the fibrous material and the binder matrix. The bond strength of commercial glass fibers, either coated or uncoated, is unsatisfactory because it is hardly possible for the fiber surface to interlock with the matrix. According to the present invention, the decisive step towards elimination of this drawback consists in coating the fiber surface with hydrated or unhydrated fine cement dust or fine calcium silicate or calcium silicate hydrate dust. The fine dust can be applied either together with an organic sizing which at the same time brings about the bond with the fiber surface, or it can be applied after this sizing. According to the invention, it is also possible to cover the fibers with dust immediately after they have left the drawing die and while they are still in a highly viscous state. In the latter case the bond to the fiber is brought about by thermal reaction. In these three cases the fine dust is conductive to the punctual quasi-epitaxial growth of hydration products of the matrix during the setting phase. Another advantage in addition to this crystallographic/-chemical bond is the surface roughness produced by the dust particles, which improves the purely mechanical interlock.

What is claimed is:

1. Method for the production of mineral fibers resistant to alkaline media which are to be used for the micro-reinforcement of cement-, lime- and/or plaster-bound or bituminous binders of building materials, which comprises the steps of preparing a starting material which is a mixture of extrusive rocks with an addition of 4 to 6 weight percent $ZrO_2$, related to the resultant mineral fibers, the composition of the mixture used as the starting material, related to the purely oxidic constituents, being as follows:

| | | |
|---|---|---|
| $SiO_2$ | between | 48 and 51 weight percent |
| $Al_2O_3$ | between | 12 and 14 weight percent |
| $Fe_2O_3$ | between | 8 and 10 weight percent |
| CaO | between | 6 and 8 weight percent |
| MgO | between | 10 and 12 weight percent |
| $TiO_2$ | between | 2 and 6 weight percent |
| $ZrO_2$ | between | 4 and 6 weight percent |
| $K_2O + Na_2O$ | up to | 5 weight percent maximum |

the mixture being readily fusible and easy to process into fibers, fusing said mixture at a temperature between 1350° C. and 1500° C., processing said fused mixture into fibers having a diameter of 10 to 20 $\mu$m, and subjecting the fibers to a two stage heat treatment to achieve recrystallization, the temperature during the first stage being between 650° and 750° C. and during the second stage being between 800° and 900° C., and the treatment time in the first and second stages of the two stage being less than one minute, the resultant fibers being resistant to alkaline media and having high mechanical strength.

2. Method as claimed in claim 1 wherein the $TiO_2$ content of the end product is adjusted to between 3 and 6 weight percent, related to the resultant mineral fibers.

3. Method as claimed in claim 1 wherein the extrusive rock used is at least two members of the group consisting of foamed lava, quartz porphyry, andesite, basalt and diabase.

4. Method as claimed in claim 1 wherein the $ZrO_2$ is added in the form of $ZrSiO_4$ (zirconium silicate).

5. Mineral fibers for the micro-reinforcement of cement-, lime- and/or plaster-bound or bituminous binders or building materials having the following composition:

| | | |
|---|---|---|
| $SiO_2$ | between | 48 and 51 weight percent |
| $Al_2O_3$ | between | 12 and 14 weight percent |
| $Fe_2O_3$ | between | 8 and 10 weight percent |
| CaO | between | 6 and 8 weight percent |
| MgO | between | 10 and 12 weight percent |
| $TiO_2$ | between | 2 and 6 weight percent |

-continued

| | | |
|---|---|---|
| $ZrO_2$ | between | 4 and 6 weight percent |
| $K_2O + Na_2O$ | up to | 5 weight percent maximum |

the mineral fiber being resistant to alkaline media and having high mechanical strength.

6. Mineral fibers as claimed in claim 5 wherein the mineral fibers have a diameter of 10 to 20 μm.

* * * * *